United States Patent [19]

Hedengren et al.

[11] Patent Number: 5,463,201
[45] Date of Patent: Oct. 31, 1995

[54] SEAM-TRACKING APPARATUS FOR A WELDING SYSTEM EMPLOYING AN ARRAY OF EDDY CURRENT ELEMENTS

[75] Inventors: Kristina H. V. Hedengren; Kenneth B. Haefner, both of Schenectady, N.Y.

[73] Assignee: Generla Electric Company, Schenectady, N.Y.

[21] Appl. No.: 13,601

[22] Filed: Feb. 4, 1993

[51] Int. Cl.⁶ .................... B23K 26/00; B23K 15/00; G01N 27/90
[52] U.S. Cl. .................... 219/121.83; 219/121.13; 219/121.63; 219/124.34; 318/576; 324/242
[58] Field of Search ................ 214/121.83; 318/576, 318/653; 219/124.34, 121.63, 121.64, 121.13, 121.14, 121.32; 324/236, 237, 238, 262, 242

[56] References Cited

U.S. PATENT DOCUMENTS

| | | | |
|---|---|---|---|
| 3,444,459 | 5/1969 | Prindle et al. | 324/242 |
| 4,206,391 | 6/1980 | Varacins | 318/576 |
| 4,441,010 | 4/1984 | Cornu et al. | 219/124.34 |
| 4,477,712 | 10/1984 | Lillquist et al. | 219/124.34 |
| 4,513,195 | 4/1985 | Detriche | 219/124.34 |
| 4,645,917 | 2/1987 | Penney et al. | 250/201 |
| 4,675,502 | 6/1987 | Haefner et al. | 219/124.34 |
| 4,763,070 | 8/1988 | Hüschelrath | 324/242 |
| 4,783,695 | 11/1988 | Eichelberger et al. | 357/65 |
| 5,047,719 | 9/1991 | Johnson et al. | 324/242 |
| 5,124,640 | 6/1992 | Cheru | 324/262 |
| 5,146,163 | 9/1992 | Nawa | 324/242 |
| 5,182,513 | 1/1993 | Young et al. | 324/242 |
| 5,262,722 | 11/1993 | Hedengren | 324/242 |
| 5,278,498 | 1/1994 | Vernon et al. | 324/262 |
| 5,315,234 | 5/1994 | Sutton, Jr. et al. | 324/262 |
| 5,389,876 | 2/1995 | Hedengren et al. | 324/242 |
| 5,812,513 | 1/1993 | Young et al. | 324/232 |

FOREIGN PATENT DOCUMENTS

| | | | |
|---|---|---|---|
| 135434 | 3/1985 | European Pat. Off. | 219/124.34 |
| 57-9584 | 1/1982 | Japan | 219/124.34 |
| 1734971 | 5/1992 | U.S.S.R. | 219/121.83 |

Primary Examiner—Geoffrey S. Evans
Attorney, Agent, or Firm—David C. Goldman; Paul R. Webb, II

[57] ABSTRACT

A seam-tracking apparatus for a welding system has a welding arm which directs an energy beam toward a seam. The seam-tracking apparatus includes an eddy current sensor formed by an array of eddy current elements, each producing a respective electrical signal when positioned adjacent to the seam to be tracked. An eddy current signal processor receives each respective electrical signal so as to generate position data indicative of the location of the seam. A controller is responsive to the position data so as to align the eddy current sensor and the welding arm over the seam so that the energy beam continuously impinges on the seam, as the welding arm advances along the seam. The eddy current sensor may be flexible, in which case the seam-tracking apparatus can track a seam between workpieces having curved surfaces.

22 Claims, 5 Drawing Sheets

SEAM-TRACKING APPARATUS FOR A WELDING SYSTEM EMPLOYING AN ARRAY OF EDDY CURRENT ELEMENTS

BACKGROUND OF THE INVENTION

This invention relates to a seam-tracking apparatus for a welding system and, more particularly, the present invention relates to a seam-tracking apparatus employing an eddy current sensor array.

In automated welding processes, it is desirable to be able to continuously and automatically control the positioning of a welding arm advancing relative to a weld seam. For instance, the quality of the weld joint depends to a large extent on how precisely an energy beam directed from the advancing welding arm is continuously centered or aligned relative to the seam. Such precise alignment becomes even more critical in applications wherein the beam of energy is highly concentrated over a narrow beam having a submillimeter radius dimension, as is typically the case in welding systems which use laser or electron beams or the like.

Several different forms of seam-tracking devices have been proposed to guide automated welding systems, included among such devices are industrial vision systems using TV cameras, optical sensors using a scanning laser beam for scanning the surfaces of the workpieces to be welded, and infrared sensors.

Although impressive improvements have been made in such seam-tracking devices, significant disadvantages remain. For example, the sensitivity, dynamic range and background rejection capabilities of vision systems using TV cameras generally do not permit reliable tracking of a tightly spaced seam between a pair of closely abutting workpieces to be welded. Devices using a scanning laser beam may require a relatively powerful laser to overcome variations in surface reflectivity, thus necessitating special safety precautions which are economically disadvantageous and operationally cumbersome. In the case of seam-tracking devices which employ infrared sensors, the use of infrared filters to block out extraneous infrared radiation is ordinarily required. The need of such filters adds to the cost as well as to the complexity of such infrared seam-trackers.

Eddy current sensors have also been proposed for seam-tracking devices. However, eddy current seam-tracking devices of the kind proposed heretofore, in general, lack both the resolution and accuracy detection capability required for precisely tracking tightly joined seams. Moreover, eddy current seam-tracking devices proposed heretofore have usually employed essentially inflexible eddy current sensors which, as may be expected, cannot conform to an arbitrary surface geometry in the workpieces to be welded, thereby such seam-tracking devices have had limited applications in welding operations in which the workpieces to be welded have significantly curved surfaces. In addition, eddy current seam-tracking devices proposed heretofore have commonly used eddy current sensors comprising a single sense element which has not been able to provide the resolution and sensitivity required to accurately and precisely track a tight seam having a rapidly varying curvature in an arbitrarily configured workpiece surface, thereby having limited applications in welding operations wherein the seam to be tracked is not substantially straight.

OBJECTS OF THE INVENTION

It is an object of the present invention to provide a new and improved apparatus and method for seam-tracking in welding applications.

It is another object of the present invention to track a seam with a high degree of accuracy and precision.

Yet another object of the present invention is to provide a seam-tracking apparatus conformable to an arbitrary surface geometry of the workpieces to be welded.

It is a further object of the invention to provide a seam-tracking apparatus having sufficient sensitivity and resolution for continuous tracking of a seam having a rapidly varying curvature.

It is yet another object of the invention to provide a welding system using an improved seam-tracking apparatus.

SUMMARY OF THE INVENTION

The above and further objects of the present invention will become apparent as the description proceeds. In accordance with the present invention, a seam-tracking apparatus is provided for a welding system in which an advancing welding arm directs at least one energy beam (e.g., a laser or an electron beam and the like) toward a seam between closely abutting workpieces to be welded. The apparatus includes an eddy current sensor comprising a plurality of spatially correlated eddy current elements supported forwardly of the advancing welding arm. Each of the eddy current elements, preferably operating in a differential mode, produces a respective electrical signal in response to being positioned adjacent to the seam. An eddy current signal processor is connected to each eddy current element to receive and to process each respective electrical signal so as to generate position data indicative of the current location of the tracked seam. The apparatus further comprises a controller connected to the eddy current signal processor and responsive to the seam position data for aligning the eddy current sensor between the abutting workpieces such that at least a portion of the eddy current elements of the sensor is continuously positioned over the seam. The controller also aligns the welding arm over the seam so that in operation energy beams directed from the advancing welding arm continuously impinge on the seam. In one aspect of the invention, the plurality of eddy current elements can be substantially flexible and disposed within a flexible structure (for example using a photolithographic fabrication process), and thus conformable to an arbitrarily shaped workpiece. In another aspect of the invention, the plurality of eddy current elements is arranged to form a spatially staggered array comprising successive rows of such eddy current elements. The collective sensitivity of the staggered array is such that continuous tracking of a seam having an arbitrarily varying geometry can be achieved. In yet another aspect of the invention the seam-tracking apparatus when operatively connected to the welding system provides a welding system having automatic and continuous seam tracking capability.

BRIEF DESCRIPTION OF THE DRAWINGS

The features of the present invention believed to be novel are set forth with particularity in the appended claims. The invention itself, both as to organization and method of operation, together with further objects and advantages thereof, may be best understood by reference to the following description in conjunction with the accompanying drawings in which like numerals represent like parts throughout the drawing, and in which:

DETAILED DESCRIPTION OF THE INVENTION

Figure 1:
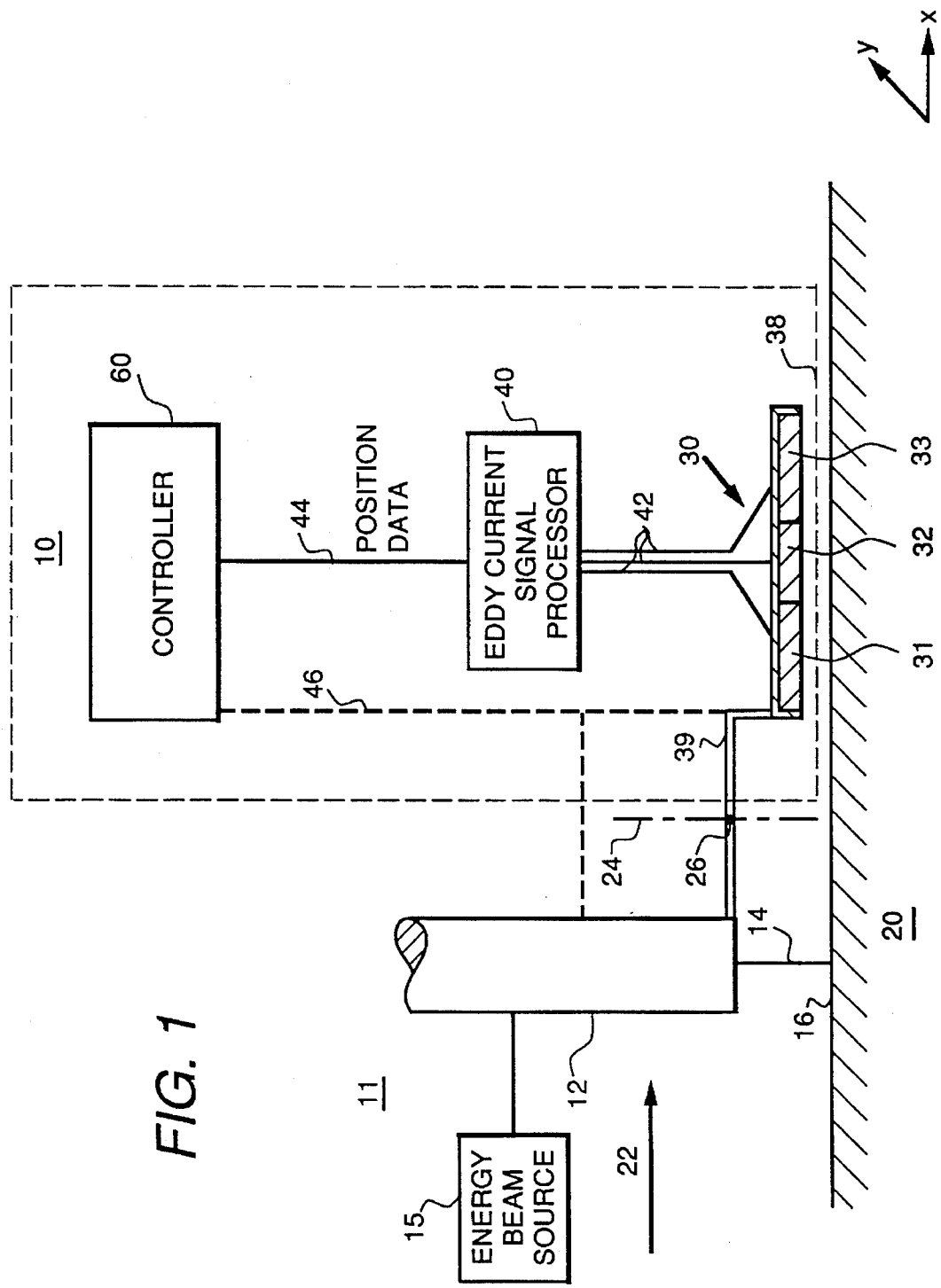
FIG. 1 shows a schematic of a seam-tracking apparatus operatively connected to a welding system and including a side elevation view of the eddy current sensor used therein.

FIG. 1 shows a seam-tracking apparatus 10 (enclosed by the dashed line rectangle) operatively connected to a welding arm 12 which is part of an automated welding system 11, being schematically represented in FIG. 1 Welding arm 12 directs a beam of energy 14 produced by an energy beam source 15 toward a seam 16 between the workpieces 20 to be welded. The energy beam source 15 may be a commercially available laser beam source, electron beam source or the like. Apparatus 10 includes an eddy current sensor 30 which comprises a plurality of spatially correlated eddy current elements (e.g. 31, 32 & 33). In general, N of such eddy current elements may be arranged to form an array disposed within a structure 38 which is supported forwardly of welding arm 12 by at least one supporting rod 39. Thus, as the welding arm 12 advances along the seam (e.g. in a direction indicated by arrow 22) so does the eddy current sensor 30.

A key advantage of the present invention is the augmented seam-tracking sensitivity which permits precise and continuous tracking of a seam having a submillimeter width dimension. In particular, the preferred embodiment of the present invention uses an eddy current sensor which comprises a plurality of precisely fabricated eddy current elements. The eddy current sensor may be of the kind but not limited to, for example, an eddy current sensor fabricated using a photolithographic process such as, for example, a photolithographic process using a High Density Interconnect (HDI) technique, as described in patent application Ser. No. 07/865,786 entitled "Flexible High Density Interconnect Structure and Flexibly Interconnected System" by C. W. Eichelberger et. al., filed Apr. 7 1992; and as described in U.S. Pat. No. 4,783,695, entitled "Multichip Integrated Circuit Packaging Configuration and Method" by C. W. Eichelberger et al. Each of the above patent application and patent are assigned to the assignee of the present invention and hereby incorporated by reference.

The referred HDI technique allows the fabrication of an eddy current sensor comprising flexible, minimized eddy current elements having a precisely matched electrical response not generally feasible with conventional eddy current elements, e.g., eddy current elements using mechanically wound coils. Description of such HDI fabricated eddy current sensor is provided in patent application Ser. No. 07/696,455 entitled "Flexible Eddy Current Surface Measurement Array For Detecting Near Surface in A Conductive Pan" by K. H. Hedengren et. al., filed May 6, 1991, assigned to the assignee of the present invention and hereby incorporated by reference. Briefly, the referred HDI technique comprises metallizing, patterning and etching steps which advantageously provide an integrated, multilayer structure constructed with precision and uniformity. For instance, each eddy current element (e.g., 31, 32 and 33) typically comprises a metallized pattern disposed in at least a layer in a flexible substrate (not shown); such as Kapton™, a polymide available from E. I. Dupont de Nemours Company. This metallized pattern is accomplished by first metallizing the flexible substrate, using sputtering or electroplating techniques to deposit thereon a coating of titanium and copper, for example. Then the patterning step, accomplished with a suitable photoresist, exposes by irradiation the metallized pattern which comprises a respective eddy current element. Thereafter, the etching step erodes away all metal but the patterned eddy current elements and associated interconnections. The above HDI technique, provided as an example of a lithographic process and not by way of limitation, can supply minimized eddy current elements having a level of precision heretofore unattainable by conventional means. The miniature size and precise fabrication of each individual eddy current element permits the accurate detection of a fine surface discontinuity having dimensions much smaller than those of the individual eddy current element. Even more significantly, the precise electrical response of each individual eddy current element allows to spatially and combine them in large numbers to form an eddy current sensor array capable not only of accurately detecting a fine surface discontinuity but also of pinpointing the precise location of such fine surface discontinuity relative to the individual eddy current elements forming the array.

Figure 2B:
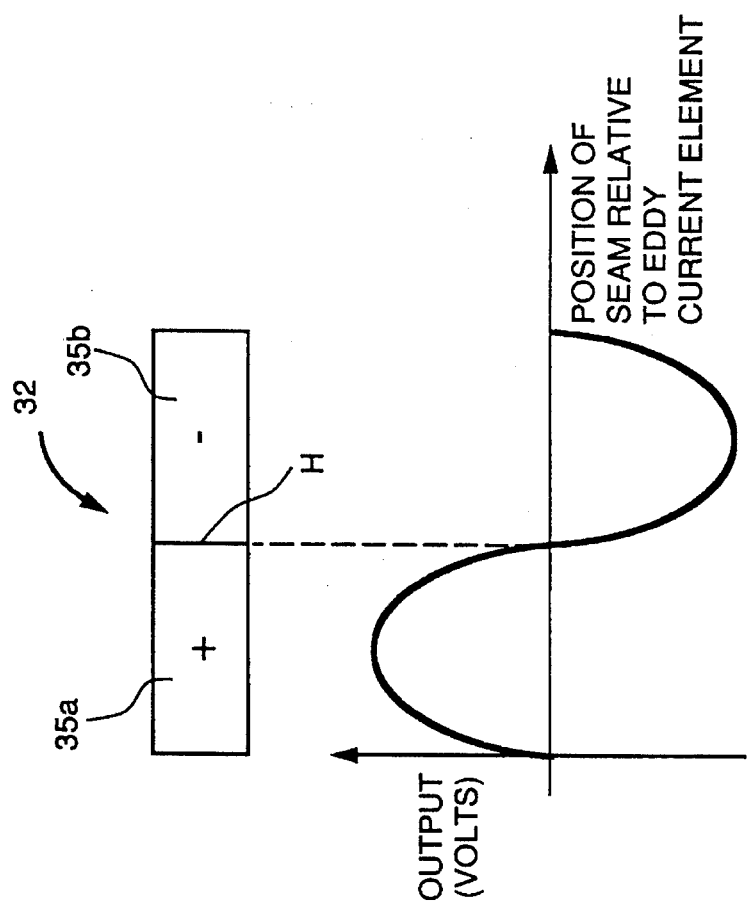
FIG. 2(b) shows a graph illustration of the voltage output of one eddy current element as a function of seam position.
Figure 2A:
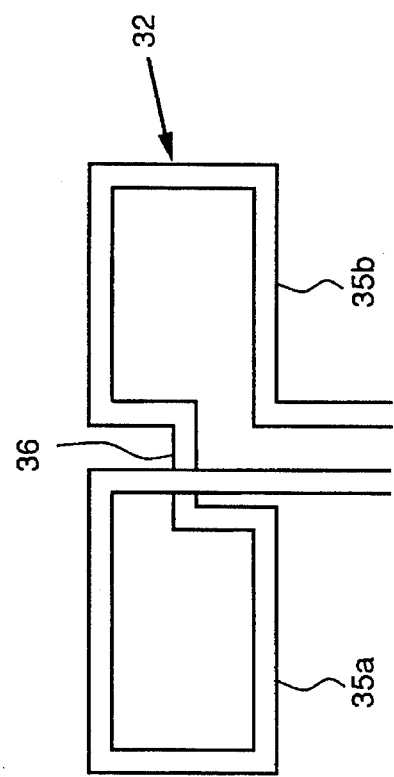
FIG. 2(a) shows a schematic top plan view of one eddy current element as used in the present invention.

For simplicity of illustration, FIG. 2(a) shows details of only one (e.g. eddy current element 32) of the three eddy current elements shown in FIG. 1 (e.g. 31, 32 & 33). As exemplified in FIG. 2(a), each eddy current element includes at least a pair of essentially identical sense coils 35a and 35b. Each sense coil which typically comprises a metallized pattern is electrically responsive to an induced time-varying magnetic field resulting from an eddy current flow in the workpieces to be welded. Such eddy current flow having been established in response to an inducing time-varying magnetic field produced by at least one drive coil (not shown) cooperating with at least one of the eddy current elements and electrically connected to an appropriate electrical current source. It will be appreciated by those skilled in the art that sense coils 35a and 35b may also be operated as drive coils by means of appropriate drive electronics. The presence of a discontinuity (e.g. the seam 16 shown in FIG. 1 ) between the workpieces to be welded causes an abrupt disruption to the eddy current flow in the vicinity of seam 16, and drastically changes the induced magnetic field respectively detected by eddy current elements 31, 32 & 33 by means of their respective sense coils. The change to the induced magnetic field thus causes each eddy current element to produce a respective electrical signal when positioned adjacent to the seam.

For the purposes d the present invention, each eddy current element is preferably operated in a differential mode,-that is, each eddy current element has its respective sense coils interconnected (as indicated in FIG. 2a) using the referred HDI technique, for example, to produce an electrical signal which is the difference of the individual responses of such respective sense coils. Since each sense coil in an eddy current element is essentially identical, an electrically connecting segment 36 between sense coils 35a and 35b can provide a "virtual ground", assuming connecting segment 36 is disposed in a layer not shared by sense elements 35a and 35b. The "virtual ground" provides a common reference potential eliminating the need for a physical ground connection and thus enhancing the response of the eddy current element to the presence of the seam. FIG. 2(b) illustrates in further detail the response of a typical eddy current element (e.g. 32) operating in a differential mode. For example, the presence of a seam adjacent to one section of the eddy current element (e.g., the section corresponding to sense element 35a) causes the eddy current element to produce a positive output voltage, while a seam adjacent to a remaining section of the eddy current element (e.g., the section corresponding to sense element 35b) produces a negative voltage. In each case the output voltage level varies in accordance with the position of the seam relative to the respective sense element. For example, a seam directly positioned along line H causes the eddy current element to produce approximately a zero voltage output. Thus, as indicated in the graph, the output voltage of the eddy current element indicates not only the presence of the seam but also the position of the seam relative thereto.

FIG. 1 further illustrates an eddy current signal processor 40 electrically connected, by a set of electrical leads 42, to receive each respective electrical signal produced by each of the eddy current elements 31, 32 & 33. The eddy current signal processor 40 may be similar to the multichannel eddy current data acquisition system described in U.S. Pat. No. 5,182,513 entitled "Method and Apparatus for a Multichannel Multifrequency Data Acquisition System for Nondestructive Eddy Current Inspection Testing" by J. D. Young et al., assigned to the assignee of the present invention and hereby incorporated by reference. The eddy current signal processor 40 processes in parallel each of the electrical signals received from eddy current elements 31, 32 & 33 and spatially correlates the received signals to produce real time position data indicative of the current location of seam 16.

The seam position data is supplied to a controller 60 by means of a data bus 44 connected to the eddy current signal processor 40. The controller 60 (which may be of the kind described in U.S. Pat. No. 4,675,502 entitled "Real Time Tracking Control for Taught Path Robots", by K. B. Haefner et al., assigned to the assignee of the present invention and hereby incorporated by reference) is responsive to the seam position data to generate servo commands automatically controlling an electromechanical linkage such as, for example, a robotic-arm or the like (schematically represented by heavy dashed line 46) mechanically connected to welding arm 12 and to supporting rod 39. In particular, the electromechanical linkage 46 can mechanically steer the welding arm 12 along the seam (e.g. along axes X & Y) so that energy beam 14 is precisely aligned to strike seam 16. In addition, by way of example and not of limitation, the electromechanical linkage 46 can mechanically rotate supporting rod 39 about an axis of rotation 24 passing through a pivot point 26 so as to allow angular motion of the eddy current sensor 30. The angular motion can be selected so that at least a portion of the eddy current elements is continuously aligned over seam 16, and thus ensuring that seam position data is continuously supplied to the controller 60. It should be appreciated that other mechanical implementations for aligning the eddy current sensor over the seam can be equally effective, so long as such implementations permit at least a portion of the eddy current elements to be continuously aligned over the seam.

Figure 3:
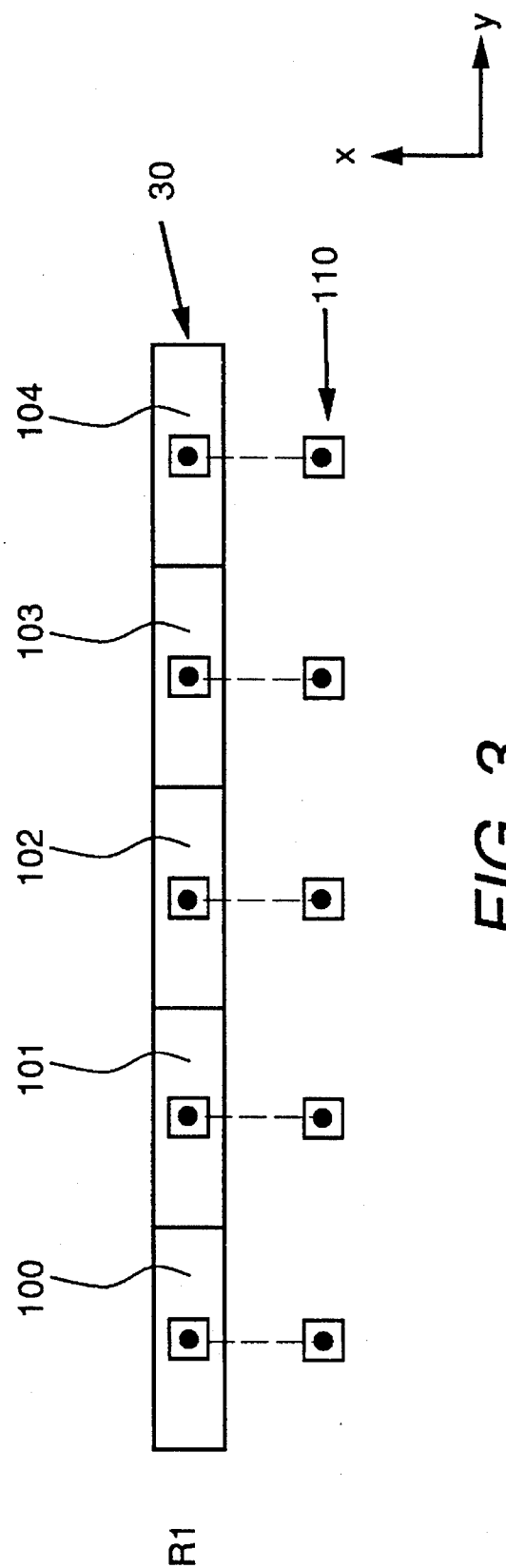
FIG. 3 shows a schematic top plan view of an eddy current sensor used in the present invention.

FIG. 3 shows a top view of one eddy current sensor 30 which can be conveniently used in welding operations where the seam to be tracked, although having a submillimeter width dimension, does not exhibit a particularly demanding geometry. In other words, the seam is either substantially straight or has a slowly changing geometry. Here, the eddy current sensor comprises an array of eddy current elements arranged in a fast row R1 which includes for illustrative purposes five eddy current elements 100–104. As the eddy current sensor travels along a preferred seam-tracking direction (e.g. the X axis), a response representative of each eddy current element is conceptually represented by each of the boxed dots centered within each respective element. The boxed dots along row 120 collectively represent the spatial resolution (e.g. along the Y axis) of the illustrated eddy current sensor array, that is, an array having a single row of eddy current elements. Each of the responses may be indicative of the location of a seam detected by a respective one of the eddy current elements, as the array travels along the X axis. Since each of the eddy current elements has a predetermined spatial location, each electrical signal generated by a respective eddy current element, in response to the presence of the seam, is used to pinpoint the location of the seam.

Figure 4:
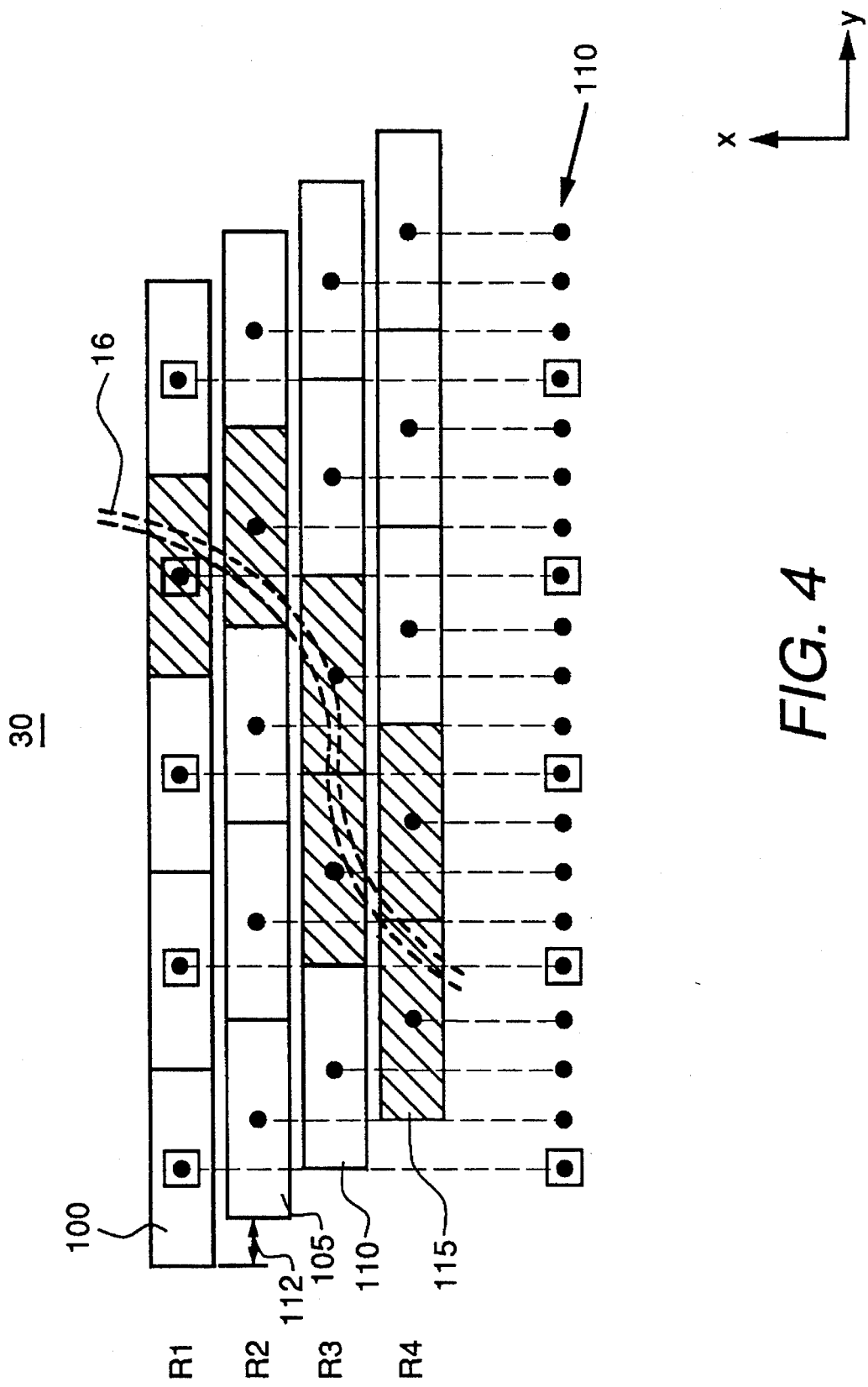
FIG. 4 shows a schematic top plan view of another eddy current sensor over a seam to be tracked.

FIG. 4 shows a top view of another eddy current sensor 30 which comprises an array of successive rows (e.g. R1–R4), positioned substantially perpendicular to the preferred seam-tracking direction (e.g. along the X axis), each row is substantially identical to the row R1 illustrated and described in the context of FIG. 3. In general the array may comprise a number of L×M eddy current elements arranged in L rows each having M eddy current elements. For the sake of description of operation, the array is positioned over seam 16 (illustrated as having an arbitrarily changing geometry) which causes a portion of the eddy current elements (e.g. those positioned adjacent to the seam) to provide an electrical signal indicative of the position of the seam. Each eddy current element responding to the presence of the seam is depicted in FIG. 4 with a shaded interior. In particular, each of the eddy current elements in FIG. 4 is arranged so that each corresponding element in each of the rows is spatially staggered relative to one another. For example, each corresponding element 100, 105, 110 and 115, is spatially staggered relative to each other by a preselected displacement along the Y axis (for example, as indicated by line 112). Here, the dots in row 120 represent the collective spatial resolution provided by an eddy current sensor comprising an array of eddy current elements staggered in successive rows. Again, the boxed dots in row 120 correspond to the spatial resolution provided by each of the eddy current elements in the first row R1 of the array, unboxed dots correspond to the enhanced spatial resolution provided by the remaining eddy current elements in the additional rows (R2–R4). It should be appreciated by those skilled in the art that the increased resolution provided by the eddy current array, as illustrated in FIG. 4, is achieved not only because of the spatial staggering of individual eddy current elements but also because of the precise electrical response of each of the individual eddy current elements therein. Thus as the eddy current sensor travels along a preferred scanning direction (e.g. along the X axis), the collective response of each of the individual eddy current elements thereof provides the sensitivity and resolution required for the continuous and precise tracking of a seam 16 having not only a narrow width dimension but also having an arbitrarily changing geometry. In operation, each of the shaded eddy current elements generates an electrical signal which not only indicates the presence of the seam but also precisely indicates the location of the seam. As described in the context of FIG. 1, each of those electrical signals is processed and spatially correlated, by means of the eddy current signal processor to produce data indicative of the precise positioning of the seam.

Figure 5:
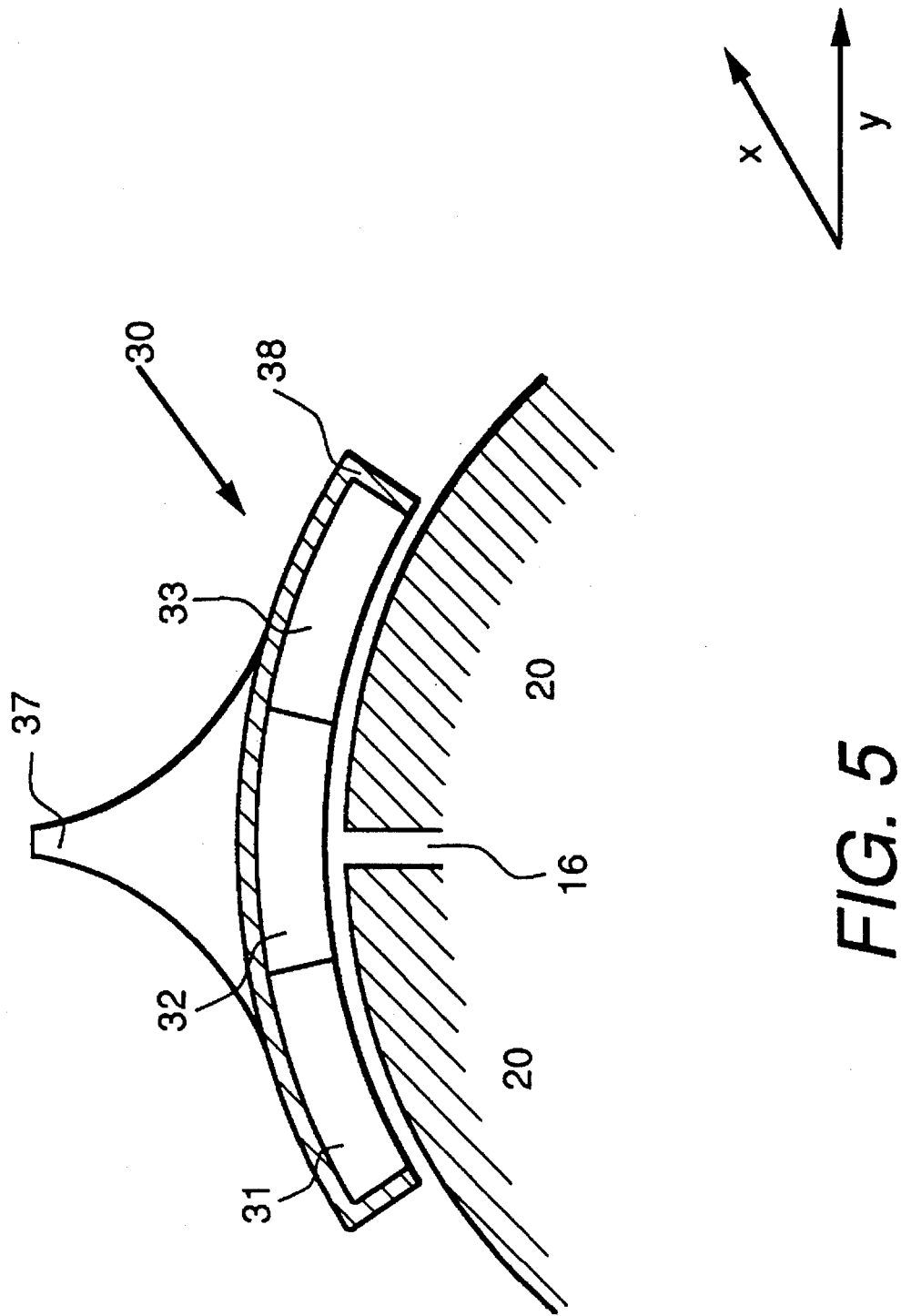
FIG. 5 shows a schematic front elevation view of another embodiment of the present invention.

FIG. 5 illustrates another feature of the present invention which advantageously allows the tracking of a seam 16 between workpieces 20 having substantially curved surfaces. As described in the above incorporated by reference patent application Ser. No. 07/696,455, the eddy current sensor may comprise flexible eddy current elements (e.g. 31, 32 & 33) enclosed by a flexible structure 38, for example, made of flexible ferrite material, which can be connected to biasing means 37, such as a spring mechanism, a resilient member or the like. In cooperation with the electromechanical linkage 46 (schematically illustrated in FIG. 1), biasing means 37 can urge and conform the flexible eddy current sensor against at least one of the surfaces of the workpieces to be welded.

It will be understood that the features of the invention shown and described herein are exemplary only. Numerous variations, changes, substitutions and equivalents will now occur to those skilled in the art without departing from the spirit and scope of the present invention. Accordingly, it is intended that all subject matter described herein and shown in the illustrative drawings be regarded as illustrative only and not in a limiting sense and that the scope of the invention claimed be determined solely by the appended claims.

What is claimed is:

1. A seam-tracking apparatus for a welding system in which an advancing welding arm directs at least one energy beam toward a tightly jointed seam having a varying curvature that is between at least a pair of abutting workpieces to be welded, said seam-tracking apparatus comprising:

an unitary eddy current sensor supported forwardly of said advancing welding arm, said unitary eddy current sensor comprising a plurality of spatially correlated eddy current elements forming an array having successive rows of said eddy current elements, said successive rows positioned wherein each of said eddy current elements in each of the successive rows are spatially staggered a predetermined distance from each other and staggered in a direction perpendicular to the varying curvature of the tightly joined seam, each of said eddy current elements in each of the successive rows producing an electrical signal in response to being positioned adjacent to said tightly joined seam;

an eddy current signal processor connected to each of said eddy current elements in the array to receive and to process each of said electrical signals, said eddy current signal processor generating position data indicative of the current location of said tightly joined seam in accordance with the processed electrical signals; and a controller connected to said eddy current signal processor, said controller responsive to said position data for aligning said unitary eddy current sensor between said pair of abutting workpieces wherein at least a portion of said eddy current elements in the array is continuously positioned over the varying curvature of said tightly joined seam, and for aligning said welding arm over said tightly joined seam wherein energy beams directed from said welding arm continuously and directly impinge on the varying curvature of said tightly joined seam.

2. A seam tracking apparatus in accordance with claim 1, wherein each of said eddy current elements comprises at least a pair of sense coils electrically interconnected in a differential mode, wherein the pair of sense coils is interconnected by a connecting segment providing a virtual ground used as a reference potential.

3. A seam tracking apparatus in accordance with claim 2, wherein at least one of the sense coils produces a positive output voltage as a seam is approached and at least another sense coil produces a negative output voltage.

4. A seam-tracking apparatus in accordance with claim 1 wherein said array of eddy current elements is flexible.

5. A seam-tracking apparatus in accordance with claim 4 and further comprising a flexible structure for accommodating said flexible array.

6. A seam tracking apparatus in accordance with claim 5, further comprising biasing means for conforming said array of eddy current elements against a surface of at least one of said workpieces having a varying curvature.

7. A seam tracking apparatus in accordance with claim 6, wherein each of said eddy current elements comprises at least a pair of sense coils electrically interconnected in a differential mode, wherein the pair of sense coils is interconnected by a connecting segment providing a virtual ground used as a reference potential.

8. A seam-tracking apparatus in accordance with claim 7, wherein said at least a pair of sense coils is electrically interconnected and disposed within said flexible structure using a photolithographic fabrication process.

9. A seam tracking apparatus in accordance with claim 1, wherein the array of spatially correlated eddy current elements is two dimensional.

10. A welding system in which at least one energy beam is directed from an advancing welding arm toward a tightly joined seam having a varying curvature that is between at least a pair of abutting workpieces to be welded, said welding system comprising:

a beam source for producing said energy beam;

an unitary eddy current sensor supported forwardly of said advancing welding arm, said unitary eddy current sensor comprising a plurality of spatially correlated eddy current elements forming an array having successive rows of said eddy current elements, said successive rows positioned wherein each of said eddy current elements in each of the successive rows are spatially staggered a predetermined distance from each other and staggered in a direction perpendicular to the varying curvature of the tightly joined seam, each of said eddy current elements in each of the successive rows producing an electrical signal in response to being positioned adjacent to said tightly joined seam;

an eddy current signal processor connected to each of said eddy current elements in the array to receive and to process each of said electrical signals, said eddy current signal processor generating position data indicative of the current location of said tightly joined seam in accordance with the processed electrical signals; and a controller connected to said eddy current signal processor, said controller responsive to said position data for aligning said unitary eddy current sensor along said workpieces wherein at least a portion of said eddy current elements in the array is continuously positioned over the varying curvature of said tightly joined seam, and for aligning said welding arm over said tightly joined seam wherein energy beams directed from said welding arm continuously and directly impinge on the varying curvature of said tightly joined seam.

11. A welding system in accordance with claim 10, wherein each of said eddy current elements comprises at least a pair of sense coils electrically interconnected in a differential mode, wherein the pair of sense coils is interconnected by a connecting segment providing a virtual ground used as a reference potential.

12. A welding system in accordance with claim 11, wherein at least one of the sense coils produces a positive output voltage as a seam is approached and at least another sense coil produces a negative output voltage.

13. A welding system in accordance with claim 10, wherein the array of spatially correlated eddy current elements is two dimensional.

14. A welding system in accordance with claim 10, wherein said array of eddy current elements is flexible.

15. A welding system in accordance with claim 14 and further comprising a flexible structure for accommodating said flexible array.

16. A welding system in accordance with claim 15, further comprising biasing means for conforming said array of eddy current elements against a surface of at least one of said workpieces having a varying curvature.

17. A welding system in accordance with claim 16, wherein each of said eddy current elements comprises at least a pair of sense coils electrically interconnected in a differential mode, wherein the pair of sense coils is interconnected by a connecting segment providing a virtual ground used as a reference potential.

18. A welding system in accordance with claim 17, wherein said at least a pair of sense coils is electrically interconnected and disposed within said flexible structure using a photolithographic fabrication process.

19. A welding system in accordance with claim 18 wherein said beam source comprises an electron beam source.

20. A welding system in accordance with claim 18 wherein said beam source comprises a laser beam source.

21. A method for continuously tracking a tightly joined seam having a varying curvature that is between at least a pair of abutting workpieces to be welded by means of an advancing welding arm in a welding operation, comprising the steps of:

operating an unitary eddy current sensor forwardly of said advancing welding arm, said unitary eddy current sensor comprising a plurality of spatially correlated eddy current elements forming an array having successive rows of said eddy current elements, said successive rows positioned wherein each of said eddy current elements in each of the successive rows are spatially staggered a predetermined distance from each other and staggered in a direction perpendicular to the varying curvature of the tightly joined seam, each of said eddy current elements in each of the successive rows producing an electrical signal in response to being positioned adjacent to said tightly joined seam;

processing each electrical signal produced by each of said eddy current elements in the array to generate position data indicative of the position of said tightly joined seam;

aligning, in response to said position data, said unitary eddy current sensor over said tightly joined seam wherein at least a portion of said eddy current elements in the array is continuously positioned over the varying curvature of said tightly joined seam; and aligning said advancing welding arm over said tightly joined seam wherein beams of energy directed from said welding arm continuously and directly impinge on the varying curvature of said tightly joined seam.

22. A process according to claim 21, wherein each of said eddy current elements comprises at least a pair of sense coils electrically interconnected in a differential mode, wherein the pair of sense coils is interconnected by a connecting segment providing a virtual ground used as a reference potential.

* * * * *

UNITED STATES PATENT AND TRADEMARK OFFICE
CERTIFICATE OF CORRECTION

PATENT NO. : 5,463,201
DATED : October 31, 1995
INVENTOR(S) : Hedengren, et al

It is certified that error appears in the above-indentified patent and that said Letters Patent is hereby corrected as shown below:

On the title page: Item [73] Assignee:s: change the name of the assignee from "Generia Electric Company" to -- General Electric Company --.

Signed and Sealed this

Fifth Day of March, 1996

Attest:

BRUCE LEHMAN

Attesting Officer

Commissioner of Patents and Trademarks